United States Patent [19]

Meyer

[11] Patent Number: 5,976,452
[45] Date of Patent: Nov. 2, 1999

[54] METHOD AND APPARATUS FOR FORMING MOLDED PLASTIC ARTICLES

[75] Inventor: Todd W. Meyer, Ottawa, Ohio

[73] Assignee: Owens-Brockway Plastic Products Inc., Toledo, Ohio

[21] Appl. No.: 08/964,901

[22] Filed: Nov. 5, 1997

[51] Int. Cl.[6] ............................. B29C 49/04; B29C 49/56
[52] U.S. Cl. ....................... 264/542; 425/338; 425/450.1; 425/532; 425/534; 425/541
[58] Field of Search .................... 264/542, 540; 425/532, 534, 589, 541, 450.1, 338, 387.1

[56] References Cited

U.S. PATENT DOCUMENTS

| | | | |
|---|---|---|---|
| 2,869,177 | 1/1959 | Jurgeleit . | |
| 3,669,601 | 6/1972 | Lainesse . | |
| 3,732,045 | 5/1973 | George et al. . | |
| 3,767,747 | 10/1973 | Uhlig . | |
| 3,781,395 | 12/1973 | Uhlig . | |
| 3,940,225 | 2/1976 | Uhlig | 425/532 |
| 3,978,184 | 8/1976 | Dybala et al. . | |
| 4,560,340 | 12/1985 | Younkin et al. | 264/542 |
| 4,802,832 | 2/1989 | Shapler | 425/532 |
| 4,859,170 | 8/1989 | Aoki . | |
| 5,069,615 | 12/1991 | Schad et al. . | |
| 5,486,103 | 1/1996 | Meiring et al. . | |
| 5,551,862 | 9/1996 | Alfred, Jr. | 264/540 |
| 5,681,596 | 10/1997 | Mills et al. | 425/532 |
| 5,707,666 | 1/1998 | DiSimone et al. | 425/338 |
| 5,869,110 | 10/1997 | Ogihara | 425/534 |

FOREIGN PATENT DOCUMENTS

| 1951912 | 4/1971 | Germany | 425/534 |
|---|---|---|---|

*Primary Examiner*—Jan H. Silbaugh
*Assistant Examiner*—Dae Young Lee

[57] ABSTRACT

A method and apparatus wherein an extruder provides extruded plastic parisons to a first and second horizontally movable blow mold assemblies, and each blow mold assembly includes two sets of blow molds, and each set includes a pair of blow mold halves. The blow mold halves are closed about the tubular parisons and moved to one of two blow molding stations where a blow pin at the blow molding station blows the parison to form a hollow blow molded article. More specifically, four platens are provided in each blow mold assembly. A first pair of outer and inner platens supports the first pair of blow mold halves and a second pair of outer and inner platens supports the second pair of blow mold halves. A pair of tie rods passes through all four platens. The first outer platen is attached to the ends of the tie rods. The second outer platen is moved by a mechanism such as a cylinder or toggle mechanism for movement on the tie rods. The first inner platen is connected to the second outer platen by a second set of tie rods. The second inner platen is connected to the first outer platen by a third set of tie rods. When the first assembly of open blow mold sets is brought into position adjacent the extruder station, parisons are extruded between both sets of mold halves. The first assembly of mold sets are closed about the parisons and then moved to one of the blow stations. As the first assembly of mold sets moves away from the extruder means, the second assembly of mold sets at the other blow station is opened, releasing the containers which have been blown at the other station and the second assembly of open blow mold halves are moved to the extruder station for a continuation of the cycle.

10 Claims, 4 Drawing Sheets

METHOD AND APPARATUS FOR FORMING MOLDED PLASTIC ARTICLES

This invention relates to blow molding hollow plastic articles and particularly hollow plastic containers.

BACKGROUND OF THE INVENTION

In one type of blow molding machine, such as shown in U.S. Pat. Nos. 3,767,747, 3,781,395 and 3,978,184, a preform is extruded downwardly and preform mold halves and final blow mold halves are shifted laterally or horizontally from a position underlying the extruder. Blow pins (calibration pins) are provided in association with the blow molds.

Among the objectives of the present invention are to provide a blow molding method and apparatus of the above-described type wherein the productivity is doubled in one complete cycle; wherein the method and apparatus can be readily adapted to existing machines; and wherein the same machine can make different containers simultaneously.

In accordance with the invention, extruder means provide extruded tubular plastic parisons to first and second horizontally movable blow mold assemblies. Each blow mold assembly includes two sets of blow molds, and each set comprises a pair of blow mold halves. The blow mold halves are closed about the tubular parisons and moved to one of two blow molding stations where a blow pin at the blow molding station blows the parison to form a hollow blow molded article. More specifically, four platens are provided in each blow mold assembly. A first pair of outer and inner platens supports the first pair of blow mold halves and a second pair of outer and inner platens supports the second pair of blow mold halves. A pair of tie rods passes through all four platens. The first outer platen is attached to the ends of the tie rods. The second outer platen is moved by a mechanism such as a cylinder or toggle mechanism for movement on the tie rods. The first inner platen is connected to the second outer platen by a second set of tie rods. The second inner platen is connected to the first outer platen by a third set of tie rods. When the first assembly of open blow mold sets is brought into position adjacent the extruder station, parisons are extruded between both sets of mold halves. The first assembly of mold sets is closed about the parisons and then moved to one of the blow stations. As the first assembly of mold sets moves away from the extruder means, the second assembly of mold sets at the other blow station is opened, releasing the containers which have been blown at the other station and the second assembly of open blow mold halves are moved to the extruder station for a continuation of the cycle.

DESCRIPTION OF THE PREFERRED EMBODIMENTS

Figure 1:
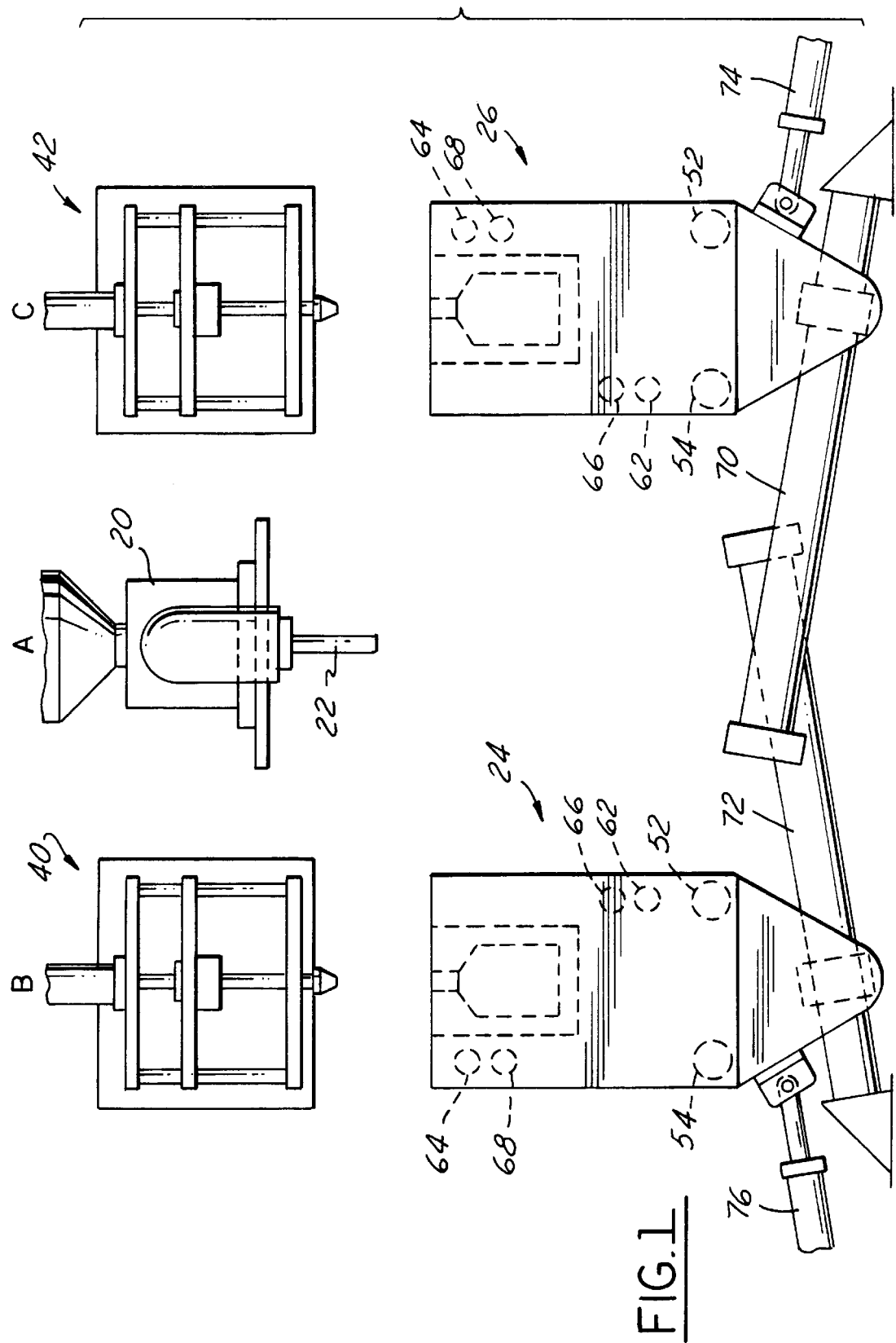
FIG. 1 is an elevational view of a blow molding machine embodying the invention.
Figure 2:
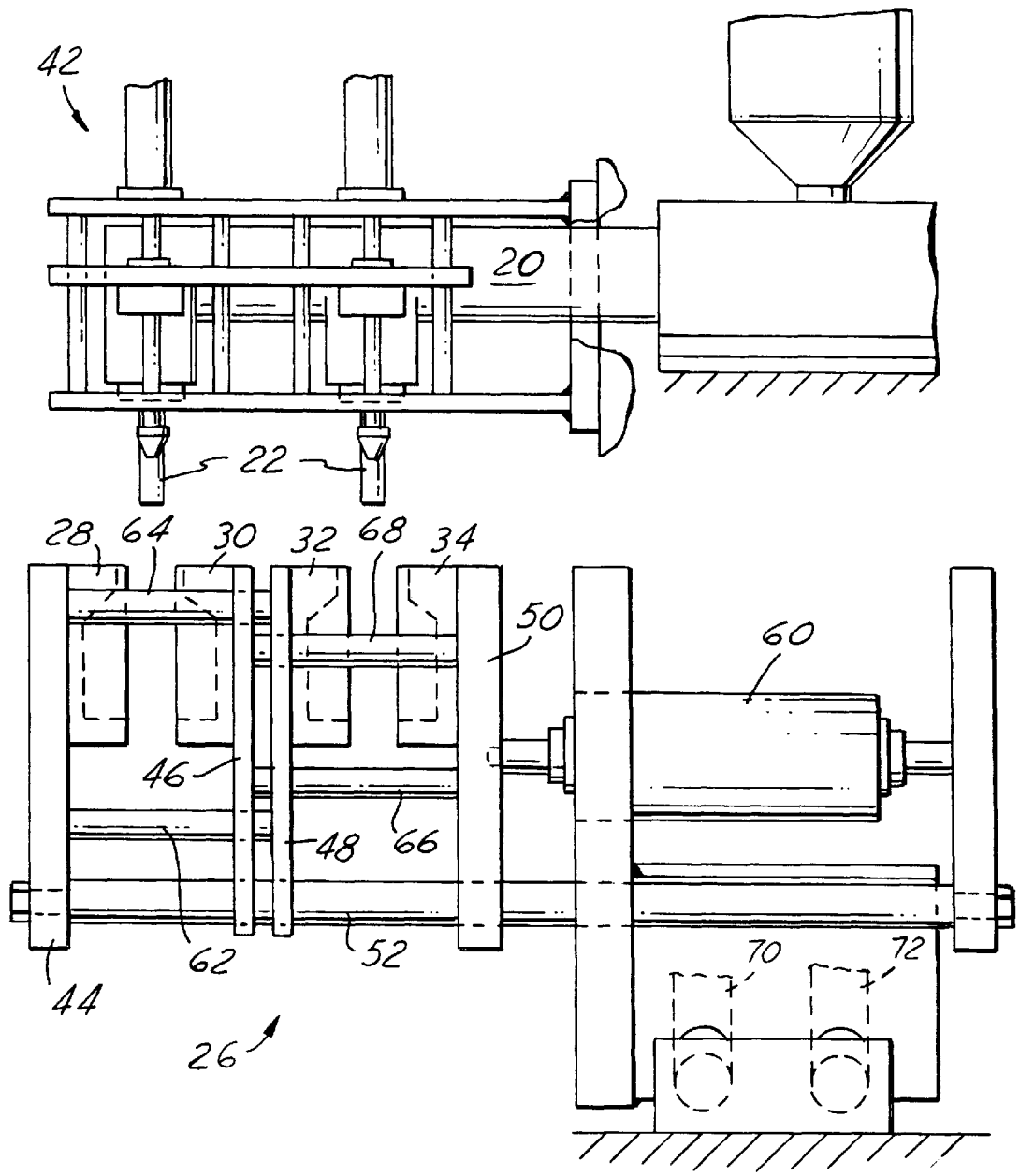
FIG. 2 is a fragmentary side view of the blow molding machine taken from the right in FIG. 1.
Figure 3:
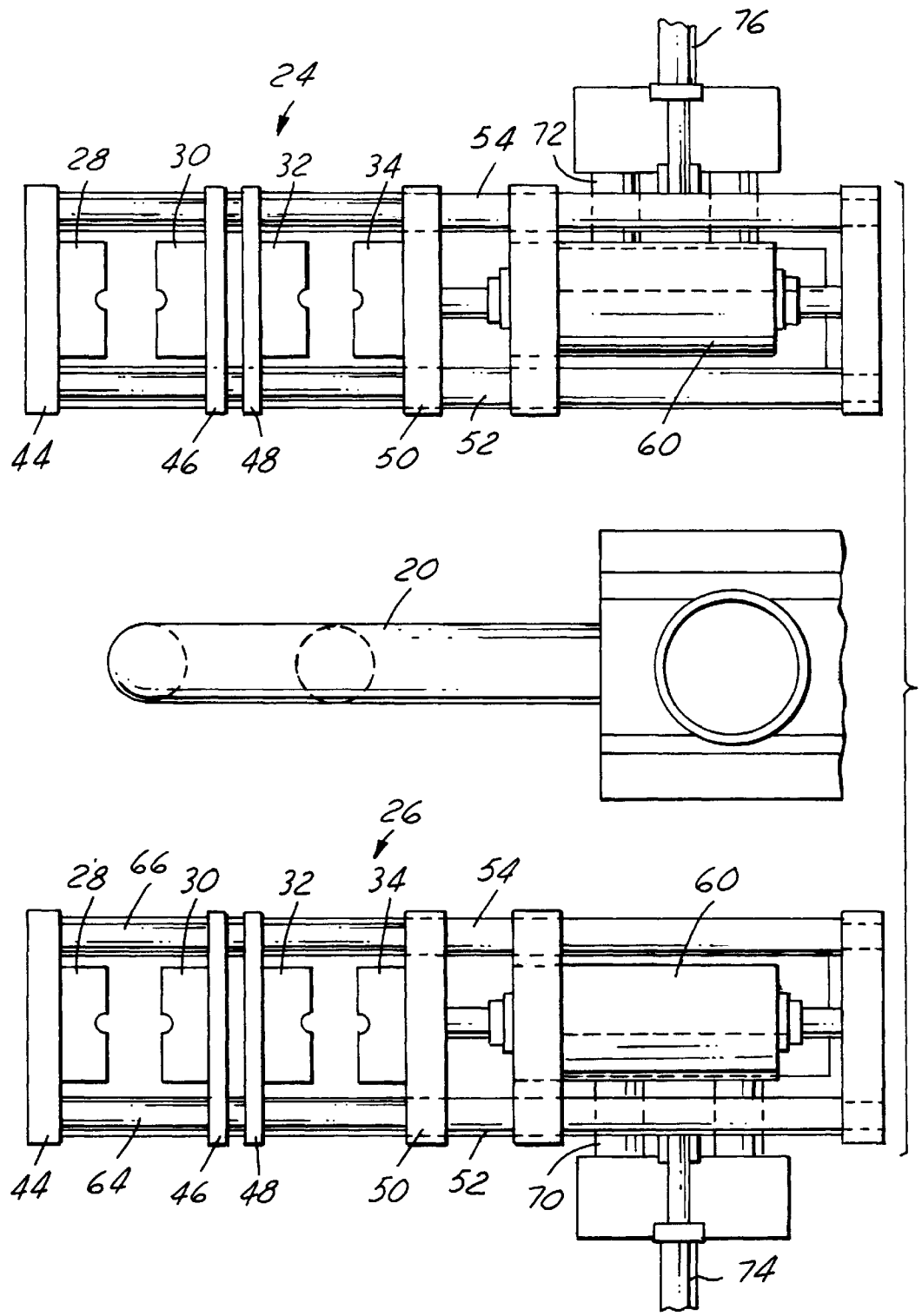
FIG. 3 is a plan view of the machine.
Figure 4:
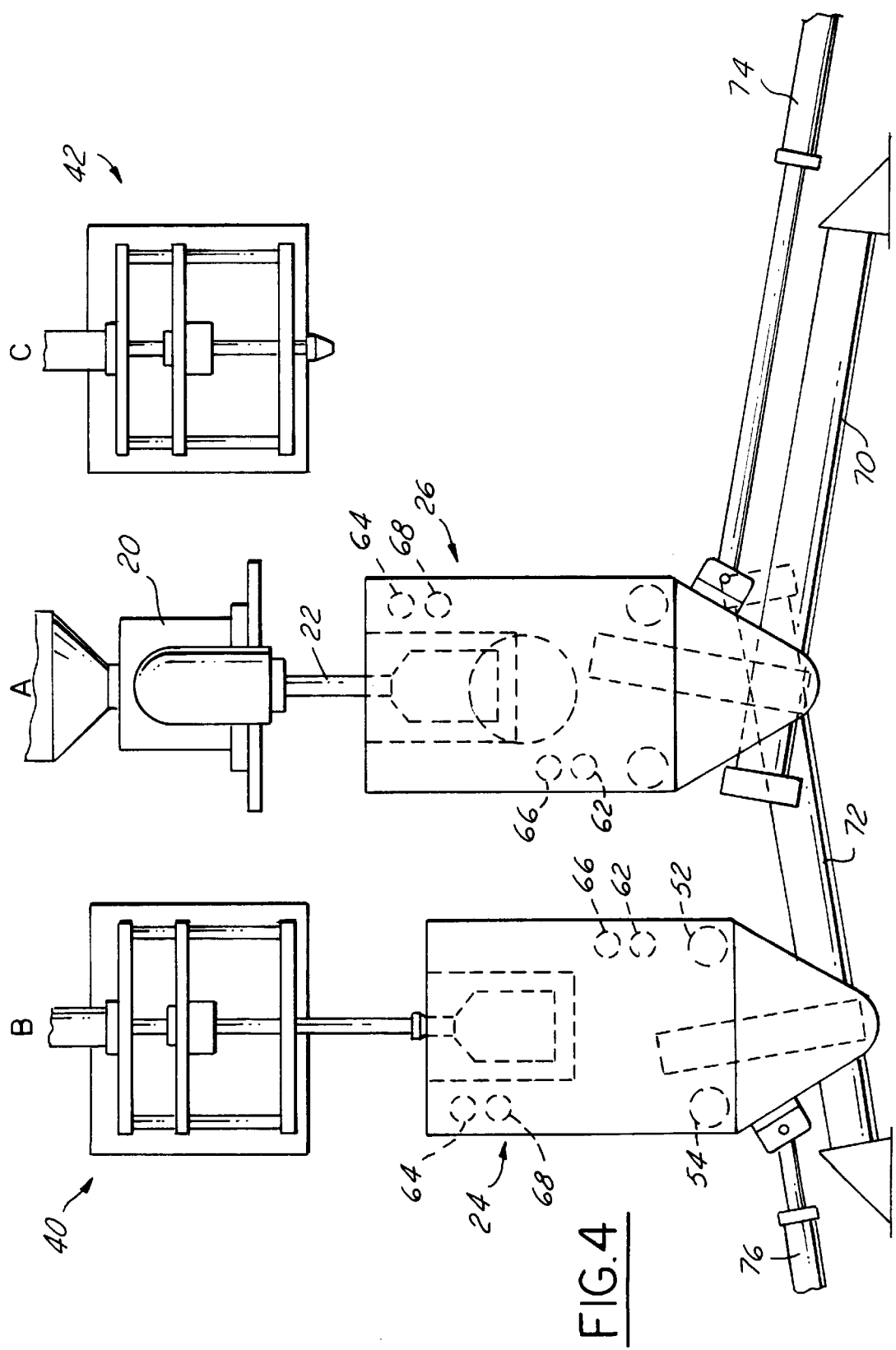
FIG. 4 is a view similar to FIG. 1 showing the machine in a different operating position.

Referring to FIGS. 1–4, in accordance with the invention, extruder means 20 at an extruder station A provide extruded tubular parisons 22 to a pair of horizontally movable sets of blow molds, and more particularly a pair of blow mold sets respectively consisting of plural blow mold assemblies 24,26, each blow mold assembly comprising plural blow mold halves 28,30 and 32,34 (FIGS. 2, 3). The blow molds are closed about the tubular parisons and moved to one of two blow molding stations B and C (FIGS. 1, 4) where blow pin assemblies 40,42 at the blow molding station blows the parisons to form hollow blow molded articles.

More specifically, as shown in FIGS. 2 and 3, each blow mold assembly 24,26 comprises four platens 44,46,48,50. A first pair of outer and inner platens 44,46 supports the first pair of blow mold halves 28,30 and a second pair of outer and inner platens 50,48 supports the second pair of blow mold halves 34,32. A pair of tie rods 52,54 passes through all four platens 44,46,48,50. The first outer platen 44 is attached to the ends of the tie rods 52,54. The second outer platen 50 is moved by a mechanism such as a cylinder or toggle mechanism 60 for movement on the tie rods 52,54. The first inner platen 46 is connected to the second outer platen 50 by a second set of tie rods 66,68. The second inner platen 48 is connected to the first outer platen 44 by a third set of tie rods 62,64.

When a blow mold assembly of open blow mold halves is brought into position adjacent the extruder station A, parisons 22 are simultaneously extruded between the first set of mold halves 28,30 and the second set of blow mold halves 32,34. The first set and second set of molds are then simultaneously closed about the parisons and the blow mold assembly is moved to one of the blow mold stations as in FIG. 4. As the blow mold assembly 26 moves away from the extruder means 20, the other blow mold assembly 24 at the other blow station C is opened releasing the containers which have been blown at the station A and the blow mold assembly 24 is then moved to the extruder station A for a continuation of the cycle.

Referring to FIGS. 1–4, the first set and second set of blow mold halves are supported, respectively, on inclined pairs of stationary shafts 70,72 such that each can be guided for movement from an upper position adjacent the extruder station A to a lower blow mold position B or C adjacent the blow pins 40,42. The assemblies 24,26 are moved along the blow mold shafts by suitable means such as cylinders 74,76.

Although the blow molds are herein shown as single cavity molds, they can comprise multiple cavity molds.

It can thus be seen that there has been provided a blow molding method and apparatus wherein the productivity is doubled in one complete cycle; wherein the method and apparatus can be readily adapted to existing machines; and wherein the same machine can make different containers simultaneously.

What is claimed is:

1. A method of blow molding hollow containers comprising providing an extruder at an extruder station for extruding parisons, providing a first blow mold assembly comprising a set of a first pair of blow molds wherein each mold comprises first and second complementary mold halves, moving said first assembly set of blow molds between said extruder station and a first blow mold station, providing a second blow mold assembly comprising a set of a second pair of blow molds wherein each mold also comprises first and second complementary mold halves, moving said second assembly set of blow molds between said extruder station and a second blow mold station, providing blow molding means at each said first and said second blow mold station for blow molding containers, and supporting said first assembly set of blow molds for movement and said second assembly set of blow molds for movement such that while one pair of molds of one of said assembly sets receives parisons at the extruder station, the other pair of molds of the other assembly set is at its respective station for blow molding containers, said step of supporting each said assembly set of said pair of blow molds further comprising,
providing a first platen,
supporting said first of said blow mold halves of said first pair of molds on said first platen,
providing a second platen,
supporting said complementary second of said blow mold halves of said first pair of molds on said second platen,
providing a third platen,
supporting said first of said blow mold halves of said second pair of molds on said third platen,
providing a fourth platen,
supporting said complementary second of said blow mold halves of said second pair of molds on said fourth platen,
interconnecting via first tie rod means said first platen and said third platen,
interconnecting via second tie rod means said second platen and said fourth platen,
relatively moving said first and fourth platens oppositely relative to one another in a closing direction, whereupon the third platen and the second platen are also moved oppositely relative to one another in a closing direction by said tie means being connected to said first and fourth platens to thereby simultaneously close both said first and said second pair of molds, and when said first and fourth platens are moved oppositely relative to one another in an opening direction, the third platen and second platen are also moved oppositely relative to one another in an opening direction by said tie rod means being connected to said first and fourth platens to thereby simultaneously open both said first and said second pair of molds.

2. The method set forth in claim 1 including providing means for guiding said platens such that they are moved along a linear line.

3. The method set forth in claim 2 including providing guide means for guiding each said pair of molds for movement in a linear path between a position at the extruder station and a position adjacent its respective blow mold station.

4. The method set forth in claim 3 including positioning said guide means such that each pair of molds is moved in an inclined direction between an upper position adjacent the extruder and a lower position adjacent its respective blow station.

5. The method set forth in any one of claims 1 and 2–4 wherein the step of providing a first pair of blow molds and the step of providing a second pair of molds comprises providing multiple cavity molds.

6. An apparatus for blow molding hollow containers comprising
an extruder means at an extruder station for extruding parisons,
a first blow mold assembly comprising a set of a first pair of blow molds wherein each mold comprises first and second complementary mold halves,
means for moving said first assembly set of blow molds between said extruder station and a first blow mold station, a second blow mold assembly comprising a set of a second pair of blow molds wherein each mold also comprises first and second complementary mold halves, means for moving said second assembly set of blow molds between said extruder station and a second blow mold station, blow molding means at each said first and said second blow mold stations for blow molding containers, and means for supporting said first assembly set of blow molds for movement and said second assembly set of blow molds for movement such that while one pair of molds of one of said assembly sets receives parisons at the extruder station, the other pair of molds of the other assembly set is at its respective station for blow molding containers;

said means for supporting each said assembly set of said pair of blow molds further comprising;
a first platen,
said first of said blow mold halves of said first pair of molds being supported on said first platen,
a second platen,
said complementary second of said blow mold halves of said first pair of molds being supported on said second platen,
a third platen,
said first of said blow mold halves of said second pair of molds being supported on said third platen,
a fourth platen,
said complementary second of said blow mold halves of said second pair of molds being supported on said fourth platen,
first tie rod means interconnecting said first platen and said third platen,
second tie rod means interconnecting said second platen and said fourth platen, and
means for relatively moving said first and fourth platens oppositely relative to one another in a closing direction, whereupon the third platen and the second platen are also moved oppositely relative to one another in a closing direction by said tie rod means being connected to said first and fourth platens to thereby simultaneously close both said first and said second pair of molds, and when the first and fourth platens are moved oppositely relative to one another in an opening direction, the third platen and second platen are also moved oppositely relative to one another in an opening direction by said tie rod means being connected to said first and fourth platens to thereby simultaneously open both said first and said second pair of molds.

7. The apparatus set forth in claim 6 including means for guiding said platens such that they are moved along a linear line.

8. The apparatus set forth in claim 7 including guide means for guiding each said pair of molds for movement in a linear path between a position at the extruder station and a position adjacent its respective blow mold station.

9. The apparatus set forth in claim 8 wherein said guide means is such that each pair of molds is moved in an inclined direction between an upper position adjacent the extruder and a lower position adjacent its respective blow station.

10. The apparatus set forth in any one of claims 6 and 7–9 wherein said first pair of blow molds and said second pair of molds comprise multiple cavity molds.

* * * * *